United States Patent
James

(10) Patent No.: US 9,441,651 B2
(45) Date of Patent: Sep. 13, 2016

(54) JOINT ASSEMBLY AND METHOD OF USING THE SAME

(71) Applicant: ROLLS-ROYCE PLC, London (GB)

(72) Inventor: Edward Simon James, Bristol (GB)

(73) Assignee: ROLLS-ROYCE plc, London (GB)

( * ) Notice: Subject to any disclaimer, the term of this patent is extended or adjusted under 35 U.S.C. 154(b) by 419 days.

(21) Appl. No.: 14/095,284

(22) Filed: Dec. 3, 2013

(65) Prior Publication Data

US 2014/0161510 A1 Jun. 12, 2014

(30) Foreign Application Priority Data

Dec. 10, 2012 (GB) .................................. 1222114.9

(51) Int. Cl.
*F16B 3/04* (2006.01)

(52) U.S. Cl.
CPC ............ *F16B 3/04* (2013.01); *Y10T 29/49947* (2015.01); *Y10T 403/20* (2015.01)

(58) Field of Classification Search
CPC .......... F16B 3/04; F16B 21/07; F16B 21/18; F16B 21/183; F16B 37/084
See application file for complete search history.

(56) References Cited

U.S. PATENT DOCUMENTS

| | | | |
|---|---|---|---|
| 3,339,832 A | 9/1967 | Duecker | |
| 3,713,604 A * | 1/1973 | Foley | B65H 75/00 242/118.11 |
| 4,678,210 A | 7/1987 | Balsells | |
| 5,014,871 A * | 5/1991 | Mutter | F16B 3/04 215/274 |
| 5,219,190 A * | 6/1993 | Grammel, Jr. | F16B 3/04 285/276 |
| 5,232,337 A * | 8/1993 | Glynn | F01D 5/06 403/326 |
| 2003/0094812 A1 | 5/2003 | Balsells | |
| 2005/0217850 A1* | 10/2005 | Cho | E21B 33/1208 166/285 |

FOREIGN PATENT DOCUMENTS

| | | |
|---|---|---|
| DE | 296 08 706 U1 | 8/1996 |
| EP | 0 367 721 A1 | 5/1990 |
| EP | 0 438 296 A2 | 7/1991 |
| FR | 2438193 A1 * | 4/1980 |
| WO | WO 88/01358 A1 | 2/1988 |

OTHER PUBLICATIONS

Apr. 3, 2013 British Search Report issued in British Application No. 1222114.9.
Dec. 9, 2015 Search Report issued in European Patent Application No. 13 00 5648.

* cited by examiner

*Primary Examiner* — Jonathan Masinick
(74) *Attorney, Agent, or Firm* — Oliff PLC

(57) ABSTRACT

A joint assembly includes an end portion of a first component that is accommodated within an end portion of a second component, with each respective first and second end portion having a corresponding first and second location feature, and an elongate resilient helical connection member. When the joint is assembled, the first and second location features together define an annular cavity into which is accommodated the connection member to interlock the first and second components to one another.

11 Claims, 4 Drawing Sheets

Fig.3
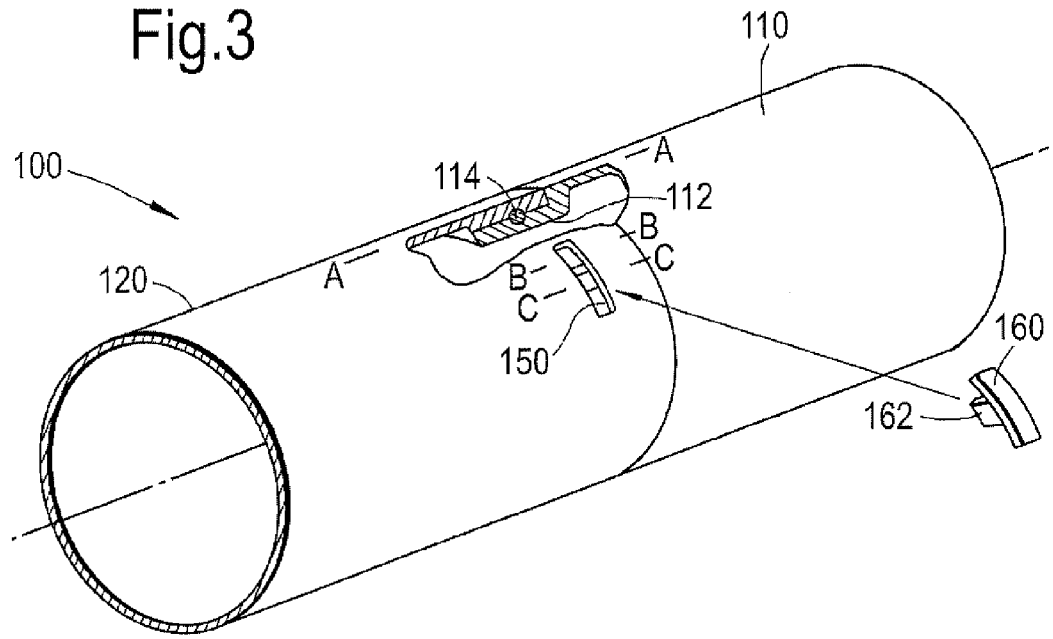
A-A
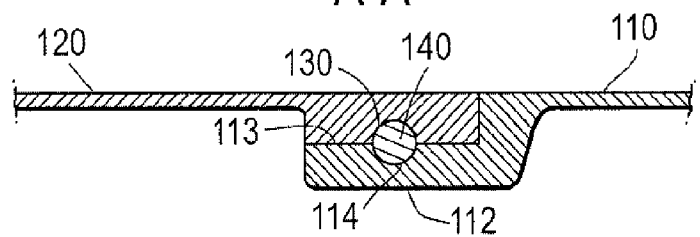
B-B
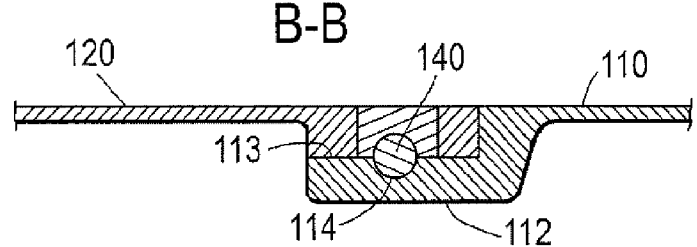
C-C
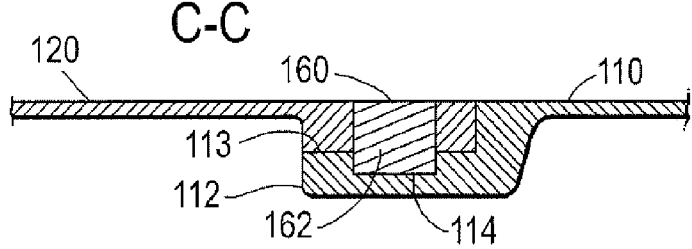

VIEW ON PLANE A-A

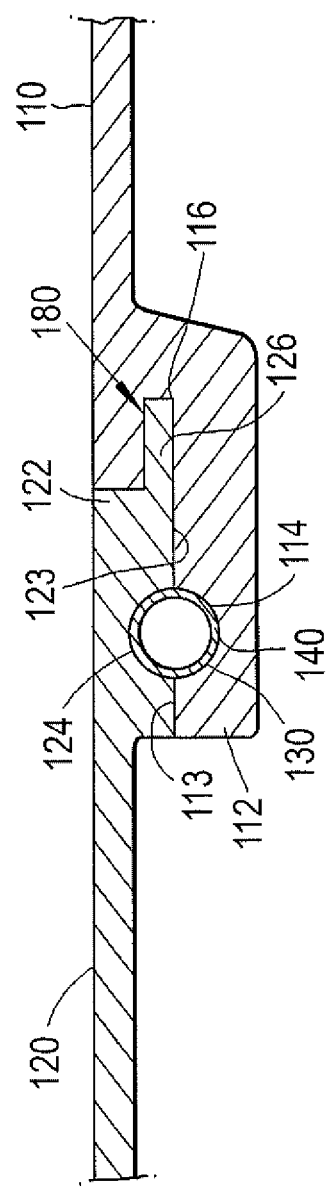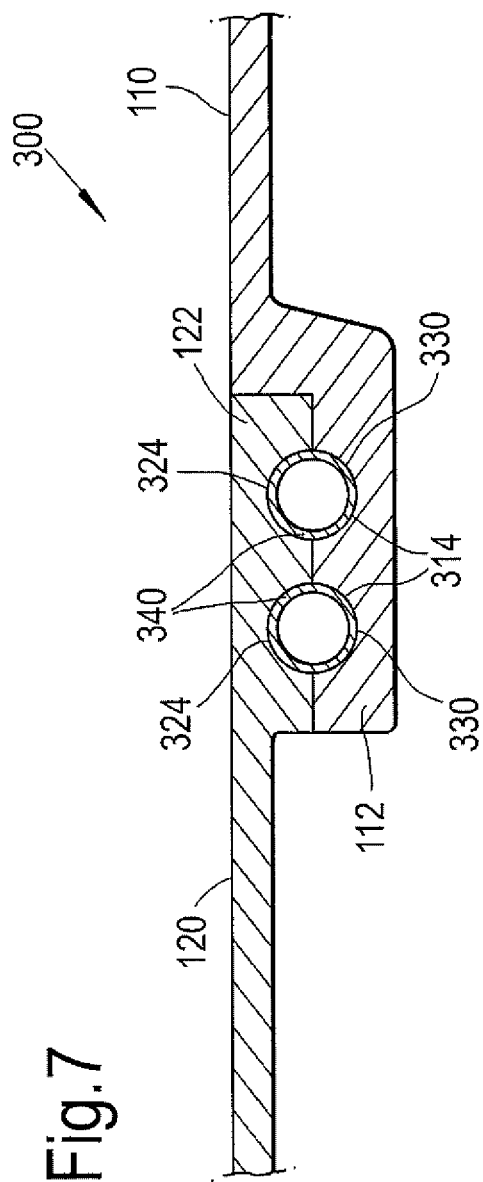

JOINT ASSEMBLY AND METHOD OF USING THE SAME

CROSS-REFERENCE TO RELATED APPLICATIONS

This invention claims the benefit of UK Patent Application No. 1222114.9, filed on 10 Dec. 2012, which is hereby incorporated herein in its entirety.

BACKGROUND OF THE INVENTION

1. Field of the Invention

The present invention relates to a joint assembly and particularly, but not exclusively, to a joint assembly for locking two components together, together with a method of using such a joint assembly.

2. Description of Related Art

It is known to use a wired joint to lock two cylindrical components to one another. Such an arrangement uses a wire having either a round (shown in FIG. 1) or square (shown in FIG. 2) cross section which is inserted into an annular cavity between the two components through a slot in the outer surface of the assembled components.

In order to ensure that the assembled components are held securely together, it is necessary for the wire to be a close fit in the annular cavity. The frictional forces resulting from this close fit make insertion, and particularly removal, of the wire difficult. This in turn renders this joint arrangement impractical for applications, such as gas turbine engines, where a cylindrical joint needs to be made and broken for maintenance and repair without having to apply undue force.

Most gas turbine engines employ conventional nut and bolt configurations to secure together the main structural engine components, such as fan and body casing parts. The temperature of gases passing through the engine can range between approximately 700° C. and approximately 2500° C. which can cause thermal cycling problems. As the engine temperature varies through such a temperature range, bolts tend to gall and seize. This can require the bolts to be drilled out during the disassembly of the engine, which is expensive and time-consuming. In addition, the use of nuts and bolts requires the use of corresponding flanges on the parts to be joined, which adds to weight and increases assembly time. Furthermore, in some arrangements, bolts heads are positioned in the gas flow path which may disrupt the aerodynamics of the engine and may accelerate the deterioration of the bolt.

The joint assembly of the present invention eliminates the requirement for a nut and bolt configuration and so reduces weight, speeds assembly and repair, minimises aerodynamic disruption in the flow path through the assembled components is simpler and less expensive than a conventional joint assembly, and reduces the high stress concentrations and bending loads associated with a bolted flanged joint.

BRIEF SUMMARY OF THE INVENTION

According to a first aspect of the present invention there is provided a joint assembly comprising an end portion of a first component, comprising a first location feature on an outermost surface thereof, an end portion of a second component, comprising a second location feature on an innermost surface thereof, and an elongate, resilient, helical connection member, the end portion of the first component being accommodated within the end portion of the second component such that the first location feature and the second location feature are aligned to form an annular cavity, the connection member being receivable within the annular cavity to thereby interlock the first component and the second component to one another.

The use of a resilient, helical connection member will make the joint assembly easier to assemble and dismantle, since it's outer diameter can be reduced on assembly and dismantling by stretching or twisting the connection member along its length.

This makes the joint assembly of the present invention a viable option for use on a gas turbine and provides the associated benefits of a bolt-less joint, a flush external joint surface, a lighter and cheaper assembled joint (particularly if the assembly costs are considered) and less distortion in the outer surface of the joined components.

By using a resilient, helical connection member instead of a solid wire, it is possible to reduce the access space required to assemble the joint due to the flexible nature of the connection member. In addition, there is no requirement to provide clearance for bolt withdrawal clearance or spanner movement.

In an alternative embodiment of the invention, the connection member may comprise a plurality of spherical or cylindrical elements linked together by a filament.

Optionally, the first component is a first revolute component and the second component is a second revolute component.

In one arrangement, the first and second components are cylindrical in cross section. An advantage of such an arrangement is that the annular cavity can be arranged on the neutral axis of cylindrical component wall. This minimises the bending loads on the joint which may result from axial loading of the joint assembly.

In other arrangements, the first and second components may have complete or partial revolute cross-sections with an alternative geometry such as, for example, an ellipse.

In still further arrangements, the first and second components may have corresponding multifaceted cross-sectional profiles. In such arrangements, a plurality of connection members would be used with a separate connection member for each facet. This arrangement could also be used to secure a bracket or mounting frame on to a casing or even an axial split line in a casing where a complete circumferential interface does not exist.

Optionally, the annular cavity has a rectilinear cross-sectional profile.

An annular cavity having a rectilinear cross-sectional profile provides a radially outermost surface against which the helical connection member presses in order to locate the first and second components together.

Optionally, the connection member is formed from a material having a rectilinear cross-sectional profile.

By forming the connection member from a material with a rectilinear cross-sectional profile, the outer surface of the connection member has a larger surface area. This means that any mechanical loads which are transmitted through the joint are distributed over this larger surface area, thus reducing local surface stresses in the material within which the annular cavity is formed.

Optionally, the connection member is formed from a metallic material.

The joint of the present invention experiences lower peak stresses than are present in a similarly sized bolted joint. Consequently, this joint arrangement is suited to manufacture from thin wall section metallic materials such as those used in gas turbine engines.

Optionally, the connection member is formed from a polymeric composite material.

As mentioned above, the lower peak stresses experienced by a joint assembly of the present invention make it well suited to joining composite components.

Optionally, the connection member is formed from a material having a greater thermal coefficient of expansion than that of either of the first component or the second component.

By forming the connection member from a material having a greater thermal coefficient of expansion than that of the components being joined, the joint is tightened when the components experience an increase in temperature. In other words, as temperatures rise, for example as a gas turbine engine reaches operating conditions, the joint becomes more secure.

Conversely, as the joint assembly cools down, the joint clearances increase and the joint becomes easier to dismantle.

Optionally, the second component further comprises an insertion slot, the insertion slot being formed as an aperture tangentially aligned with the second location feature.

The insertion slot provides access for a user to insert the connection member into the annular cavity once the first and second components have been assembled together.

In alternative embodiments of the invention, the insertion slot may be positioned in the radially innermost surface of the first component. In this way, the insertion slot provides access for a user to insert the connection member into the annular cavity from within the joint assembly. This may be more convenient in arrangements where the first and second components are of significant diameter and access to the interior of the joint assembly is more easily arranged than access to the exterior of the joint assembly.

Optionally, the joint assembly further comprises a plurality of elongate, resilient, helical connection members, each of the plurality of connection members being receivable within the annular cavity to thereby interlock the first component and the second component to one another.

Depending on the length of the joint between the components, multiple connection members could be used in order to reduce the frictional load on each individual connection member during assembly. Each connection member would be provided with a discrete insertion slot.

In other arrangements of the joint assembly, additional grooves and springs could be added. This would provide increased load carrying capacity for the joint assembly.

Optionally, the joint assembly further comprises a closure member, the closure member being accommodated within the insertion slot, with an outermost surface of the closure member being contiguous with an outermost surface of the second component.

The closure plate provides the outer surface of the assembled joint with a smooth surface. This may be advantageous if the surface is part of a gas transfer path.

Optionally, the first component further comprises a third location feature at the first end portion thereof, and the second component further comprises a fourth location feature at the first end portion thereof, wherein, when the first end portion of the first component is accommodated within the first end portion of the second component such that the first location feature and the second location feature are aligned to form an annular cavity, the third location feature and the fourth location feature are interlocked with one another.

By providing the joint assembly with a separate spigot feature, it is possible to increase the stiffness of the joint assembly and make the joint more robust.

According to a second aspect of the present invention there is provided a method of joining two components using a joint assembly, the joint assembly comprising an end portion of a first component, comprising a first location feature on an outermost surface thereof, an end portion of a second component, comprising a second location feature on an innermost surface thereof, and an elongate, resilient, helical connection member, the method comprising the steps of:
(a) inserting the first end portion of the first component into the first end portion of the second component such that the first location feature and the second location feature are aligned; and
(b) inserting an elongate, resilient, helical connection member into an annular cavity formed by the alignment of the first location feature and the second location feature.

Optionally, step (b) further comprises twisting the connection member along its length while inserting the connection member into the annular cavity.

Optionally, step (b) further comprises extending the connection member along its length while inserting the connection member into the annular cavity.

An advantage of the invention is the ability to reduce the diameter of the connection member by either stretching or twisting the connection member axially to ease the insertion of the connection member into the annular cavity. The connection member can then be returned to its original diameter by reversing this motion to create a close or 'snug' fit between the connection member and the annular cavity.

In addition, the connection member has a degree of lateral compliance which enables its insertion into the annular cavity to be largely unaffected by the presence of minor machining mismatches between the first and second location features which together define the annular cavity.

According to a first aspect of the present invention there is provided a joint assembly comprising: an end portion of a first component, comprising a first location feature on an outermost surface thereof; an end portion of a second component, comprising a second location feature on an innermost surface thereof; and an elongate, resilient, helical connection member, the end portion of the first component being accommodated within the end portion of the second component such that the first location feature and the second location feature are aligned to form an annular cavity, the connection member being receivable within the annular cavity to thereby interlock the first component and the second component to one another, and wherein the connection member is formed from a material having a rectilinear cross-sectional profile.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE SEVERAL VIEWS OF THE DRAWINGS

There now follows a description of an embodiment of the invention, by way of non-limiting example, with reference being made to the accompanying drawings in which:

FIG. 3 shows a perspective, part-sectional view of a joint assembly according to a first embodiment of the invention;

FIG. 5 shows a schematic sectional view of the joint assembly of FIG. 3 including a spigot arrangement;

FIG. 7 shows a schematic sectional view of a joint assembly according to a third embodiment of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
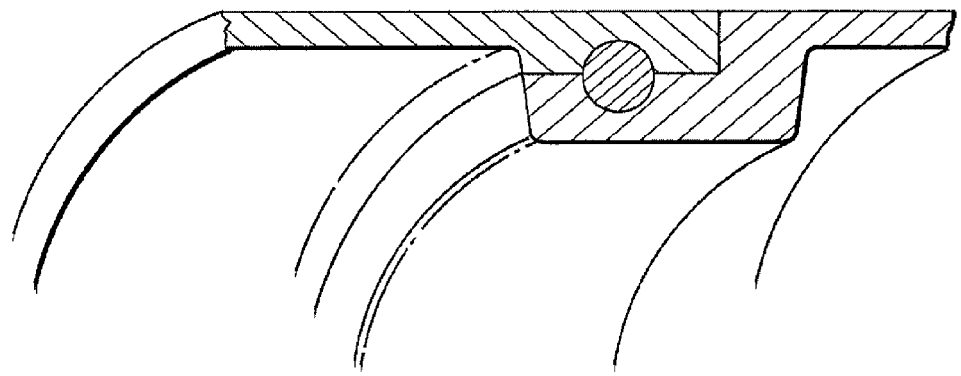
FIG. 1 shows a schematic sectional view of a wired cylinder joint according to the prior art and having a wire with a round cross sectional profile.
Figure 2:
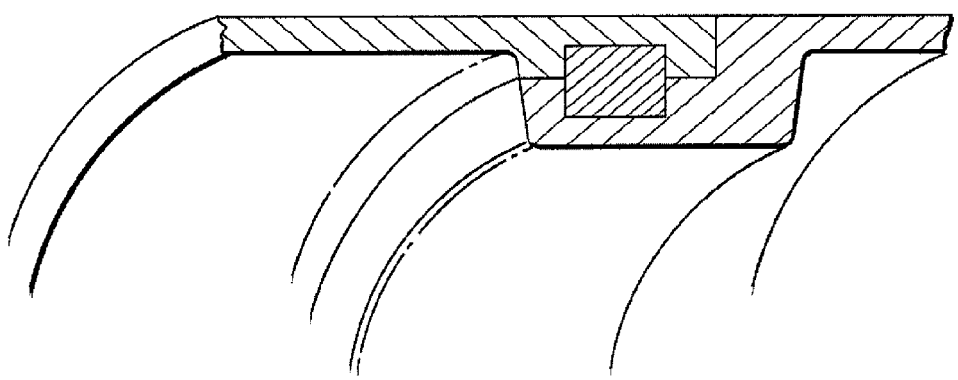
FIG. 2 shows a variant of the wired cylinder joint of FIG. 1 but having a wire with a rectangular cross sectional profile.
Figure 4:
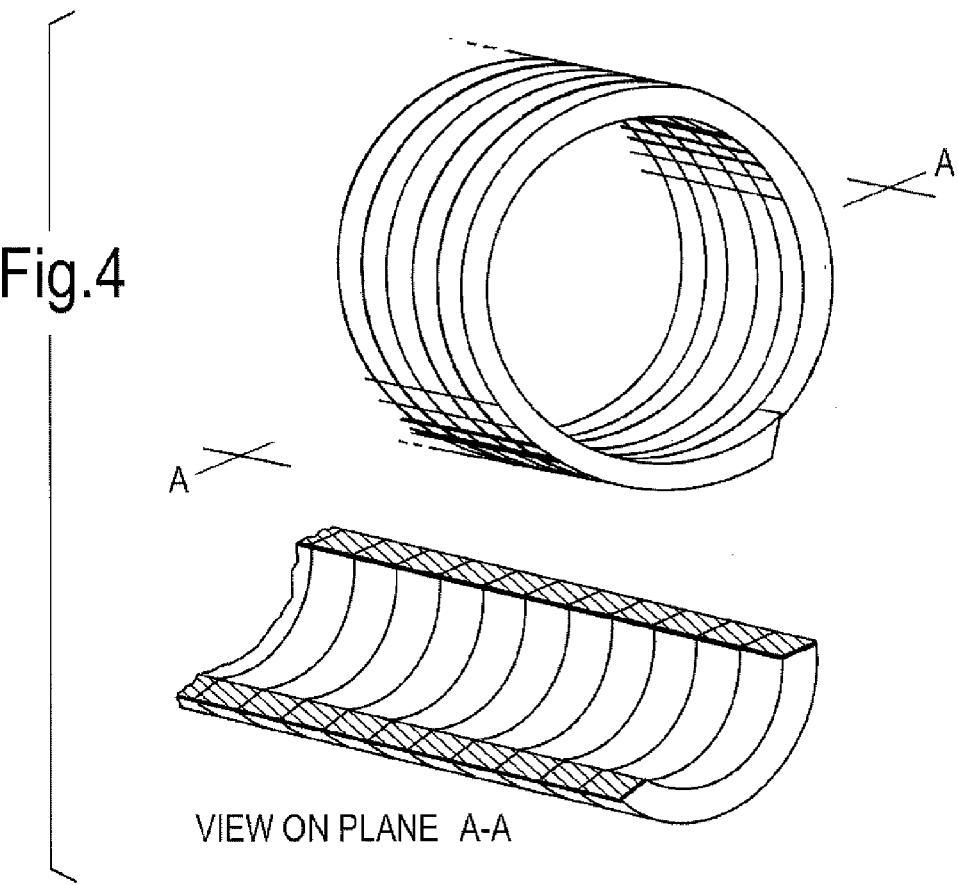
FIG. 4 shows schematic perspective and sectional views of a connection member from the joint assembly of FIG. 3.

Referring to FIGS. 3 to 5, a joint assembly according to a first embodiment of the invention is designated generally by the reference numeral 100.

The joint assembly 100 comprises a first component 110, a second component 120 and a connection member 140. The first component 110 has a first end portion 112 with a first location feature 114 positioned on an outermost surface 113 thereof. The second component 120 has a first end portion 122 with a second location feature 124 positioned on an innermost surface 123 thereof.

The end portion 112 of the first component 110 fits into, and is accommodated within, the end portion 122 of the second component 120.

In an alternative arrangement (shown in FIG. 5), a spigot 180 may be included at the joint between the first component 110 and second component 120 to thereby improve the stiffness of the joint assembly.

In this embodiment, the spigot 180 comprises an interlocking arrangement of a third location feature 116 and a fourth location feature 126 (see FIG. 4). The third location feature 116 is positioned at the end portion 112 of the first component 110 while the fourth location feature 126 is positioned at the end portion 122 of the second component 120.

In other embodiments of the invention, the spigot 180 may have a different number of location features.

When the end portion 112 of the first component 110 is located within the end portion 122 of the second component 120, the first location feature 114 and the second location feature 124 are aligned with one another to form an annular cavity 130.

The connection member 140 takes the form of an elongate, helical spring which in turn is formed from flexible stainless steel wire with a square cross-sectional profile (see FIG. 4). In other embodiments of the invention, the connection member 140 may be formed from alternative materials such as, for example, steel or other metallic materials, or polymeric composite materials.

In case of breakage of the spring forming the connection member 140 whilst in the joint assembly 100, the helical geometry of the connection member 140 would lend itself to having a screw threaded implement inserted and attached to the remaining part of the connection member 140 by screwing into the remaining part of the connection member 140. This would enable the extraction of the connection member 140 from the annular cavity 130.

The connection member 140 is received within the annular cavity 130 such that the first component 110 and second component 120 are interlocked with one another.

The end portion 112 of the first component 110 further comprises an insertion slot 150. The insertion slot 150 is oriented substantially tangentially to the first location feature 114 so as to provide an aperture extending through the thickness of the end portion 112 of the first component 110.

In the present embodiment, the insertion slot 150 is a linear aperture extending through the end portion 112 of the first component 110.

In other embodiments of the invention, the insertion slot 150 may be formed as a curved aperture, extending in the plane of the first location feature 114, and having a concave portion facing outwardly from the outermost surface 113 of the first component 110. The curved insertion slot requires less circumferential distance than a linear aperture and still allows for the insertion of the connection member 140 due to the inherent flexibility of the connection member 140.

A closure member 160 is provided to close off the insertion slot 150. The closure member 160 serves to infill the insertion slot 150 to thus provide a smooth outermost surface 113 to the first component 110.

The closure member 160 comprises an anti-rotation element 162 which serves to prevent rotation of the connection member 140 within the annular cavity 130. By preventing rotation of the connection member 140, it is possible to prevent fretting of the connection member 140 within the annular cavity 130.

The anti-rotation element 162 further serves to circumferentially locate the first component 110 and the second component 120 relative to one another.

The connection member 140 is sized such that its outer diameter is slightly greater than the corresponding diameter of the annular cavity 130.

In use, one end of the connection member 140 is rotated along its axial direction relative to the opposite end. The direction of rotation is opposite in sense to the direction of the helix forming the connection member 140. This rotation causes the outer diameter of the connection member 140 to reduce. The connection member 140 may then be inserted into the annular cavity 130. Once positioned within the annular cavity 130 the connection member 140 may be allowed to rotate back to its original orientation.

In this way when the connection member 140 is positioned within the annular cavity 130, it is tensioned so as to provide a force directed substantially normal to the plane intersecting the first location feature 114 and the second location feature 124. This force maintains the connection member 140 in place within the annular cavity 130. The force also maintains the alignment of the first component 110 and the second component 120.

Figure 6:
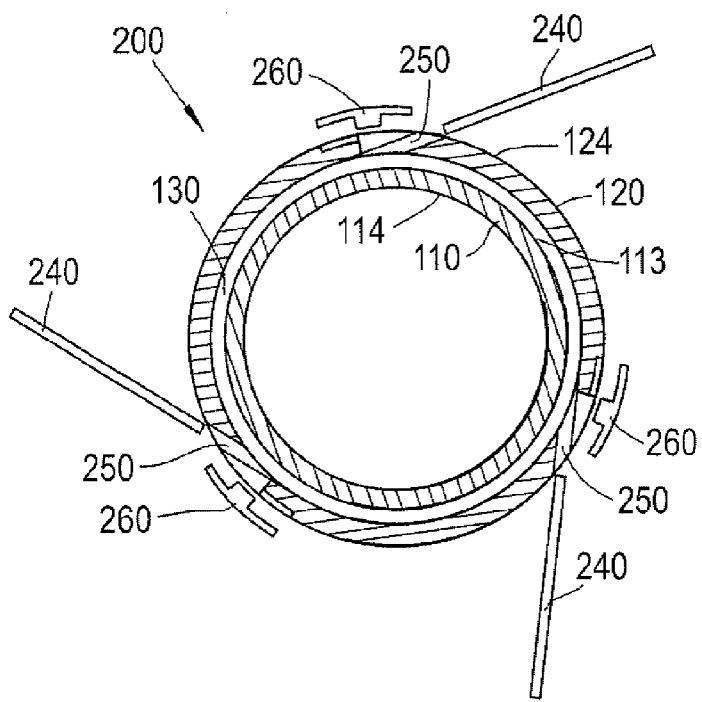
FIG. 6 shows a schematic sectional view of a joint assembly according to a second embodiment of the invention.

Referring to FIG. 6, a joint assembly according to a second embodiment of the invention is designated generally by the reference numeral 200. Features of the apparatus 200 which correspond to those of apparatus joint assembly 100 have been given corresponding reference numerals for ease of reference.

In this second embodiment (see FIG. 6), the joint assembly 200 comprises a first component 110, a second component 120 and a plurality of connection members 240.

As described above, the first component 110 and second component 120 interconnect with respective first and second location features 114,124 thereby defining an annular cavity 130.

In this embodiment, the outermost surface 113 of the first component 110 is provided with a plurality of insertion slots 250; each of the plurality of insertion slots 250 corresponding to a respective one of the connection members 240.

Each of the insertion slots 250 is provided with a respective closure member 260. The closure members 260 function as the closure member 160 described above.

Referring to FIG. 7, a joint assembly according to a third embodiment of the invention is designated generally by the reference numeral 300. Features of the joint assembly 300 which correspond to those of apparatus 100 have been given corresponding reference numerals for ease of reference.

The joint assembly 300 comprises a first component 110, a second component 120 and a plurality of connection members 340.

As described above, the first component 110 and second component 120 interconnect. However, in this embodiment, the end portion 112 of the first component 110 comprises a plurality of first location features 314, and the end portion 122 of the second component 120 comprises a corresponding number of second location features 324. In this embodiment, when the end portion 112 of the first component 110 is accommodated within the end portion 122 of the second component 120, respective pairs of the first location features 314 and second location features 324 are aligned with one another to thereby define a plurality of annular cavities 330.

Each of the annular cavities 330 receives a respective one of the plurality of connection members 340. In the embodiment shown in FIG. 7, the joint assembly 300 comprises two annular cavities 330 and two connection members 340. In other embodiments of the invention, alternative numbers of annular cavities may be provided, each with a respective connection member.

In this embodiment, the outermost surface 113 of the first component 110 is provided with a plurality of insertion slots (not shown); each of the plurality of insertion slots 250 corresponding to a respective one of the annular cavities 330.

Each of the insertion slots 350 is provided with a respective closure member (not shown). The closure members 360 function as the closure member 160 described above.

In one arrangement, the insertion slot corresponding to each of the annular cavities 330 may be circumferentially aligned with one another and may be integrated with one another as a single insertion slot. In this arrangement, there is a single closure member provided with two corresponding anti-rotation features (one feature for each annular cavity).

In another arrangement, the insertion slot corresponding to each of the annular cavities 330 may be circumferentially spaced apart from one another; each insertion slot having a corresponding closure member. This arrangement may provide an improved continuity for the load path between the first and second components.

Any of the embodiments described above may be provided with an elastomeric or metallic seal at the joint line between the first and second components to improve the seal and add a degree of axial compression to ensure the joint is axially preloaded to restrict axial movement.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

The invention claimed is:

1. A joint assembly comprising:
   an end portion of a first component, comprising a first location feature on an outermost surface thereof;
   an end portion of a second component, comprising (i) a second location feature on an innermost surface thereof and (ii) an insertion slot being formed as an aperture tangentially aligned with the second location feature; and
   an elongate, resilient, helical connection member,
   the end portion of the first component being accommodated within the end portion of the second component such that the first location feature and the second location feature are aligned to form an annular cavity,
   the connection member being receivable within the annular cavity to thereby interlock the first component and the second component to one another,
   wherein a closure member is accommodated within the insertion slot, with an outermost surface of the closure member being contiguous with an outermost surface of the second component, and
   the closure member comprises an anti-rotation element that serves to prevent rotation of the connection member within the annular cavity.

2. The joint assembly as claimed in claim 1, wherein the first component is a first revolute component and the second component is a second revolute component.

3. The joint assembly as claimed in claim 1, wherein the annular cavity has a rectilinear cross-sectional profile.

4. The joint assembly as claimed in claim 1, wherein the connection member is formed from a material having a rectilinear cross-sectional profile.

5. The joint assembly as claimed in claim 1, wherein the connection member is formed from a metallic material.

6. The joint assembly as claimed in claim 1, wherein the connection member is formed from a polymeric composite material.

7. The joint assembly as claimed in claim 1, wherein the connection member is formed from a material having a greater thermal coefficient of expansion than that of either of the first component or the second component.

8. The joint assembly as claimed in claim 1, further comprising a plurality of elongate, resilient, helical connection members, each of the plurality of connection members being receivable within the annular cavity to thereby interlock the first component and the second component to one another.

9. The joint assembly as claimed in claim 1, the first component further comprising a third location feature at the first end portion thereof, and the second component further comprising a fourth location feature at the first end portion thereof, wherein, when the first end portion of the first component is accommodated within the first end portion of the second component such that the first location feature and the second location feature are aligned to form an annular cavity, the third location feature and the fourth location feature are interlocked with one another.

10. A gas turbine engine comprising a joint assembly as claimed in claim 1.

11. A joint assembly comprising:
   an end portion of a first component, comprising a first location feature on an outermost surface thereof;
   an end portion of a second component, comprising (i) a second location feature on an innermost surface thereof and (ii) an insertion slot being formed as an aperture tangentially aligned with the second location feature; and an elongate, resilient, helical connection member, the end portion of the first component being accommodated within the end portion of the second component such that the first location feature and the second location feature are aligned to form an annular cavity, the connection member being receivable within the annular cavity to thereby interlock the first component and the second component to one another, wherein the connection member is formed from a material having a rectilinear cross-sectional profile, a closure member is accommodated within the insertion slot, with an outermost surface of the closure member being contiguous with an outermost surface of the second component, and the closure member comprises an anti-rotation element that serves to prevent rotation of the connection member within the annular cavity.

* * * * *